(12) United States Patent
Yokokura

(10) Patent No.: US 8,659,777 B2
(45) Date of Patent: Feb. 25, 2014

(54) SERVER SYSTEM, PRINT DEVICE, NETWORK PRINT SYSTEM INCLUDING SERVER SYSTEM AND PRINT DEVICE, AND DOWNLOADING METHOD IN NETWORK PRINT SYSTEM

(75) Inventor: Hidenori Yokokura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 13/194,899

(22) Filed: Jul. 29, 2011

(65) Prior Publication Data

US 2012/0050796 A1 Mar. 1, 2012

(30) Foreign Application Priority Data

Aug. 31, 2010 (JP) ................... 2010-195059

(51) Int. Cl.
*G06F 3/12* (2006.01)
(52) U.S. Cl.
USPC ........................... 358/1.15; 707/602; 707/799
(58) Field of Classification Search
USPC ....................................................... 358/1.15
See application file for complete search history.

(56) References Cited

U.S. PATENT DOCUMENTS

| 2002/0114004 A1* | 8/2002 | Ferlitsch | 358/1.15 |
| 2009/0135448 A1* | 5/2009 | Kawara | 358/1.15 |
| 2011/0255124 A1* | 10/2011 | Klassen | 358/1.15 |

FOREIGN PATENT DOCUMENTS

JP 2005-196757 A 7/2005

* cited by examiner

*Primary Examiner* — Benny Q Tieu
*Assistant Examiner* — Juan M Guillermety
(74) *Attorney, Agent, or Firm* — Fitzpatrick, Cella, Harper & Scinto

(57) ABSTRACT

In print systems based on data reception from a server, it takes much time to receive data of a large size. Therefore systems have been developed in which data is divided before being received. However, if divided data items are received by a print device while temperature adjustment or calibration is performed for an engine of the device, the divided data items are not immediately printed, resulting in a long print time. A print device sequentially receives divided data items if the print device is in a printable status. Otherwise, the print device simultaneously receives the divided data items in a plurality of sessions.

14 Claims, 15 Drawing Sheets

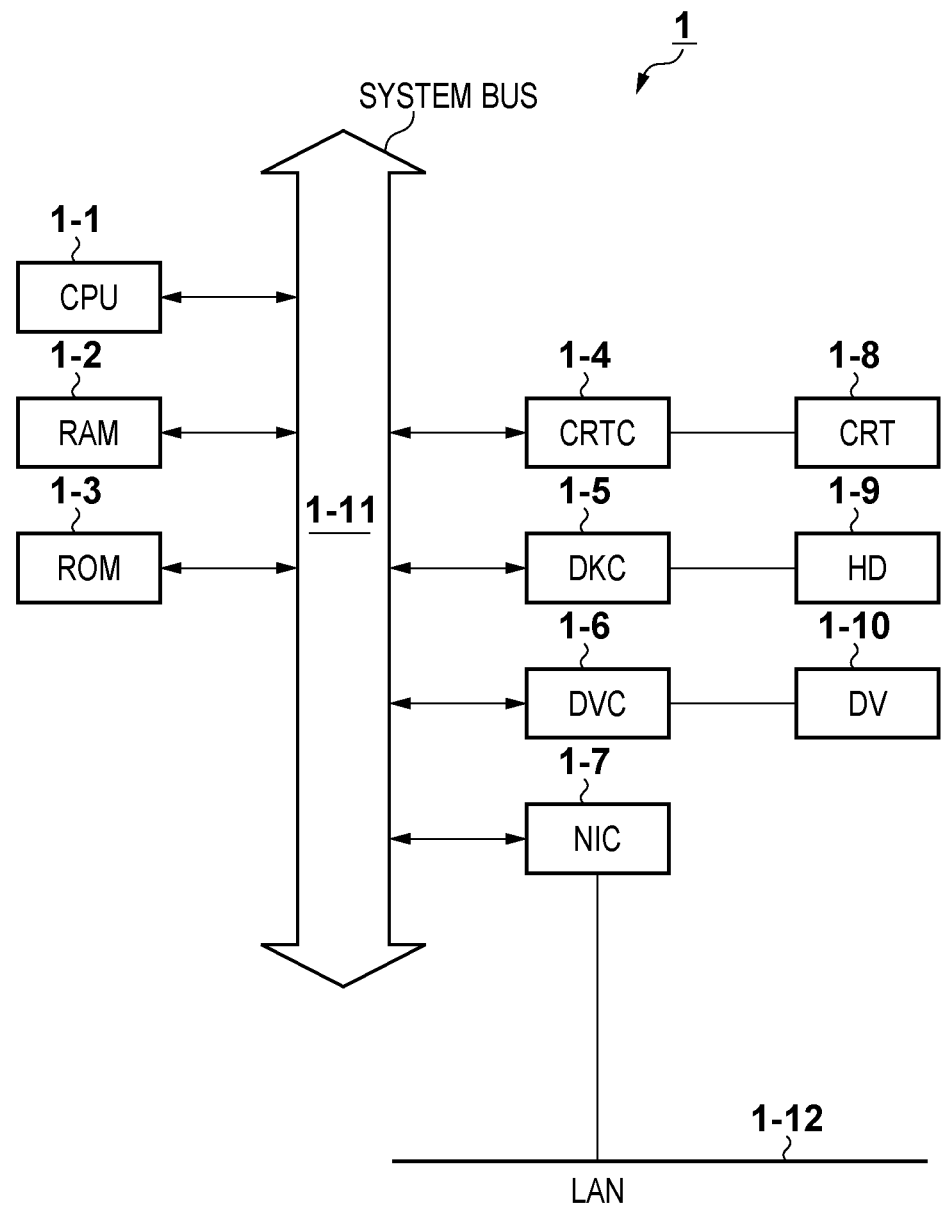
F I G. 1

F I G. 8

```
8011~<RunList Run="1">
       <LayoutElement ElementType="document">
8021~<FileSpec URL="File://gazou1.pdf" MimeType="application/PDF"/>
       </LayoutElement>
       </RunList>
8012~<RunList Run="2">
       <LayoutElement ElementType="document">
8022~<FileSpec URL="File://gazou2.pdf" MimeType="application/PDF"/>
       </LayoutElement>
       </RunList>
8013~<RunList Run="3">
       <LayoutElement ElementType="document">
8023~<FileSpec URL="File://gazou3.pdf" MimeType="application/PDF"/>
       </LayoutElement>
       </RunList>
```

F I G. 13

USING STORED FILES 13-1

SELECT A FILE AND SPECIFY WHAT TO DO WITH THE FILE.

Office 01:/folder/sample_01/

| TYPE | NAME | SIZE | DATE/TIME |
|---|---|---|---|
| ▪ | 001.pdf | 133MB | 01/17 15:02 |
| ▪ | 002.pdf | 133MB | 01/17 15:03 |
| ▪ | 003.pdf | 133MB | 01/17 15:04 |
| ▪ | 004.pdf | 133MB | 01/17 15:05 |

13-2

1/1 ◀ ▶

TOTAL: 3  SELECTED FILES: 1

FOLDER OPERATION   EDIT FILE 13-5   13-4

DETAILED INFORMATION

↖ UP

CANCEL

STORE IN BOX    PRINT AND STORE IN BOX    PRINT 13-3

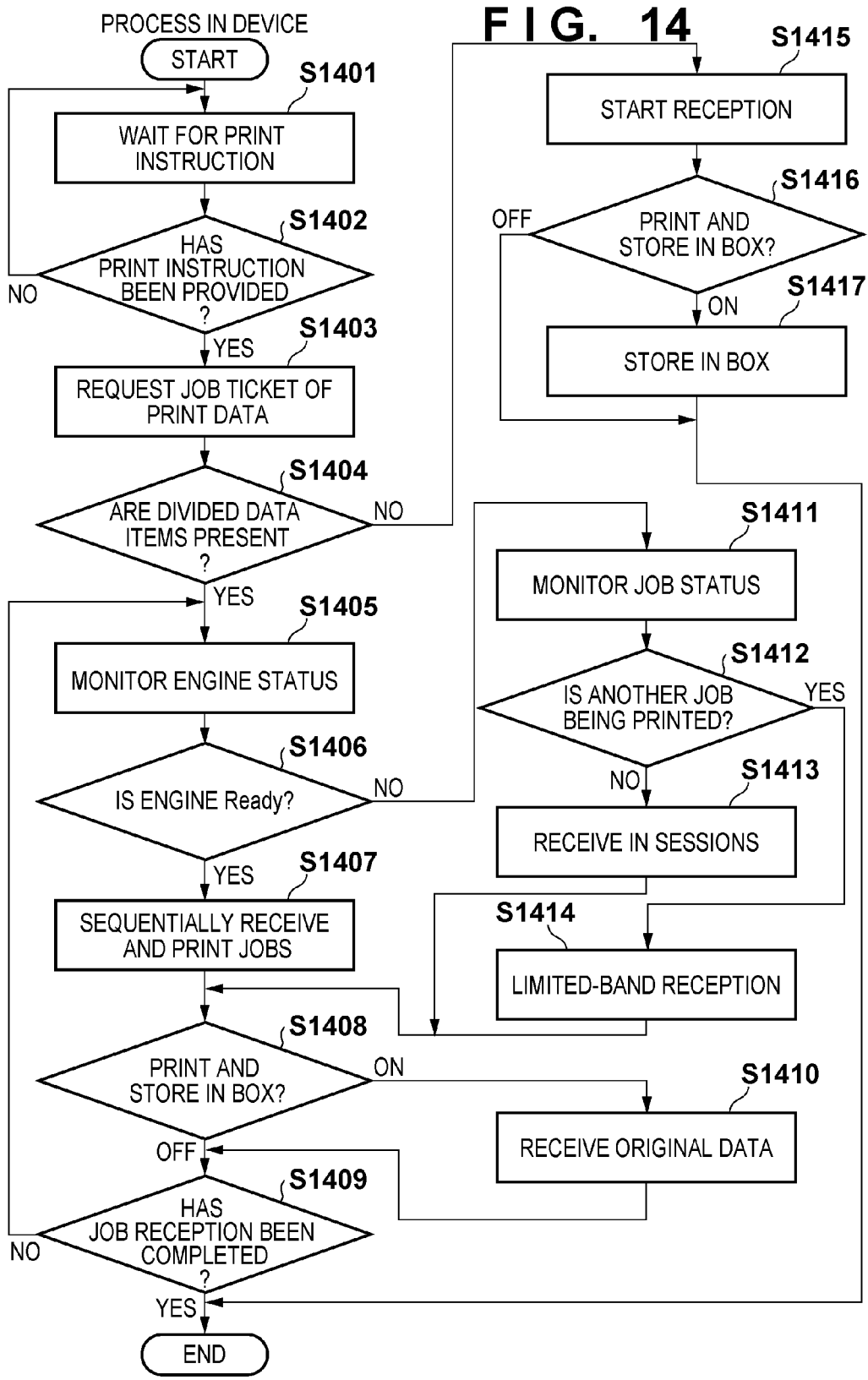

SERVER SYSTEM, PRINT DEVICE, NETWORK PRINT SYSTEM INCLUDING SERVER SYSTEM AND PRINT DEVICE, AND DOWNLOADING METHOD IN NETWORK PRINT SYSTEM

BACKGROUND OF THE INVENTION

1. Field of the Invention

The present invention relates to a server system, a print device, a network print system including the server system and the print device, and a downloading method in the network print system.

2. Description of the Related Art

Recently, establishment of infrastructures called cloud services, in which services are provided by a server system connected to the Internet, has been in progress. Print services for pull printing over the Internet have also been provided: the services offer functions of generating and distributing print data with a server on the Internet at the request of a print device (see Japanese Patent Laid-Open No. 2005-196757, for example). Now, systems that provide such print services by using the aforementioned Cloud are being developed. Such systems generally use formats widely in use for digital documents to be printed. Among others, data in PDF (Portable Document Format) of Adobe Systems Incorporated is often used.

In the PDF format, however, a structure description necessary for interpreting the structure of data of a digital document to be printed is written at the end of the digital document. To interpret a PDF file, the entire PDF file has to be downloaded to refer to the structure description at the end of the file. Accordingly, downloading and printing cannot be processed in parallel. Since printing cannot be started until downloading is finished, it may take much time to complete printing.

The downloading and printing of a file can be currently performed in parallel if, for example, a file in a format with a structure description written at the beginning of the file is used for a print service. Even in this case, printing of divided PDF file portions received by a print device is delayed if immediate printing is prevented by temperature adjustment, calibration, or paper jam in the engine of the print device. This may cause a decrease in the overall efficiency, resulting in a long print time.

In addition, in the above case, if too high a priority is placed on a reception process for the print device to receive data from a cloud server, the print process may be delayed because the reception is performed preferentially over the print process.

SUMMARY OF THE INVENTION

The present invention has been made in view of the above conventional examples and provides a server system, a print device, a network print system including the server system and the print device, and a downloading method in the network print system, capable of efficient and ready processing of document data having a structure that allows printing to be started only after the document data is downloaded to the end.

The present invention further provides a server system, a print device, a network print system including the server system and the print device, and a downloading method in the network print system, capable of performing processing as efficiently as possible even in a situation that prevents printing to be immediately started, for example at the occurrence of a malfunction.

According to one aspect of the present invention, the present invention provides a network print system including a print device and a server system, the server system comprising: a dividing unit, configured to divide uploaded document data into a plurality of document data items if the document data has a size exceeding a threshold; a generating unit, configured to generate a job ticket for printing the document data; a saving unit, configured to save the document data and the job ticket as a print job; and a transmitting unit, configured to transmit the saved document data or job ticket of the document data in response to a request from the print device, and the print device comprising: a determining unit, configured to request, upon input of a print instruction to print the document data saved in the server system, the job ticket of the document data from the server system and refers to the job ticket received from the server system in response to the request to determine whether or not the document data is divided into a plurality of divided jobs; and a receiving unit, configured to, if it is determined that the document data is divided, request and receive from the server system the plurality of divided document data items in an order described in the job ticket when the print device is in a printable status, or request and receive from the server system the plurality of divided document data items in parallel when the print device is in an unprintable status.

According to another aspect, the present invention provides a server system connected with a print device and including a storage unit for saving externally uploaded document data described in PDF (Portable Document Format), the server system comprising: a dividing unit, configured to divide the uploaded document data into a plurality of document data items; a generating unit, configured to generate a job ticket for printing the plurality of divided document data items; a saving unit, configured to save the plurality of divided document data items and the job ticket in the storage unit; and a transmitting unit, configured to transmit the plurality of divided document data items and the job ticket saved in the storage unit in response to a request for printing from the print device, wherein the transmitting unit further configured to transmit the undivided original document data saved in the storage unit in response to a request from the print device.

According to still another aspect, the present invention provides a print device connected with a server system, the print device comprising: a determining unit, configured to request, upon input of a print instruction to print document data saved in the server system, a job ticket of the document data from the server system and refers to the job ticket received from the server system in response to the request to determine whether or not the document data is divided into a plurality of divided jobs; and a receiving unit, configured to, if it is determined that the document data is divided, request and receive from the server system the plurality of divided document data items in an order described in the job ticket when the print device is in a printable status, or request and receive from the server system the plurality of divided document data items in parallel when the print device is in an unprintable status.

According to another aspect, the present invention provides a print device connected to a server system and including a storage unit, the print device comprising: a requesting unit, configured to transmit, upon input of a print instruction to print document data saved in the server system, a request for printing of the document data to the server system; a receiving unit, configured to receive, in response to the request, a plurality of document data items resulting from dividing the document data instructed to be printed and a job ticket for printing the document data items; a printing unit, configured to perform printing by using the plurality of divided document data items and the job ticket received by the receiving unit; and a saving unit, further configured to request and receive the undivided original document data from the server system and save the undivided original document data in the storage unit if it is specified that the document data instructed to be printed is to be saved in the storage unit.

According to still another aspect, the present invention provides a method in a print device connected with a server system, the method comprising: upon input of a print instruction to print document data saved in the server system, requesting a job ticket of the document data from the server system and referring to the job ticket received from the server system in response to the request to determine whether or not the document data is divided into a plurality of divided jobs; and if it is determined that the document data is divided, requesting and receiving from the server system the plurality of divided document data items in an order described in the job ticket when the print device is in a printable status, or requesting and receiving from the server system the plurality of divided document data items in parallel when the print device is in an unprintable status.

According to the present invention, downloading from the Cloud can be efficiently performed depending on a device state or a job type, and processing such as printing can be efficiently performed.

Further features of the present invention will become apparent from the following description of exemplary embodiments with reference to the attached drawings.

BRIEF DESCRIPTION OF THE DRAWINGS

FIG. 1 is a diagram showing an internal configuration of a print device according to a first embodiment of the present invention;

FIG. 8 is a diagram showing an example of a job ticket in which a list of divided jobs is described according to the first embodiment of the present invention;

FIG. 13 is an example of a UI screen according to a second embodiment of the present invention; and FIG. 14 is a flowchart in the device that receives data according to the second embodiment of the present invention.

DESCRIPTION OF THE EMBODIMENTS

First Embodiment

Configurations of Print Device and Server Device

FIG. 1 is a diagram showing an internal configuration of a print device according to a first embodiment of the present invention. The print device in this embodiment refers to a computer peripheral with a print function, and examples thereof include a printer and a multifunctional copier. In the internal configuration in FIG. 1, a single CPU implements a network control unit and a device (printer) control unit. The print device 1 includes a CPU 1-1 that executes programs stored in a ROM 1-3 and a RAM 1-2, and the CPU 1-1 centrally controls each device connected to a system bus 1-11. The RAM 1-2 functions as main memory and a work area for the CPU 1-1. The RAM 1-2 also implements backup RAM that stores various setting values while continuously powered by a battery or the like. A CRT controller (CRTC) 1-4 controls display on a CRT display (CRT) 1-8. A user can use the CRT display 1-8 to provide instructions, such as an instruction to start printing based on a list of data on the Cloud. A disk controller 1-5 controls a hard disk (HD) 1-9 that stores images and various sorts of user data. A device controller (DVC) 1-6 controls a printer and a scanner (DV) 1-10. A network interface card (NIC) 1-7 can communicate with a server via a LAN 1-12.

Although this embodiment does not include a keyboard, it is to be understood that a keyboard may be included. The HD may not be included, or the HD may be replaced with a component capable of storing data, such as nonvolatile memory. Various setting values may be stored in a nonvolatile storage device other than the backup RAM, such as in an HDD.

Figure 2:
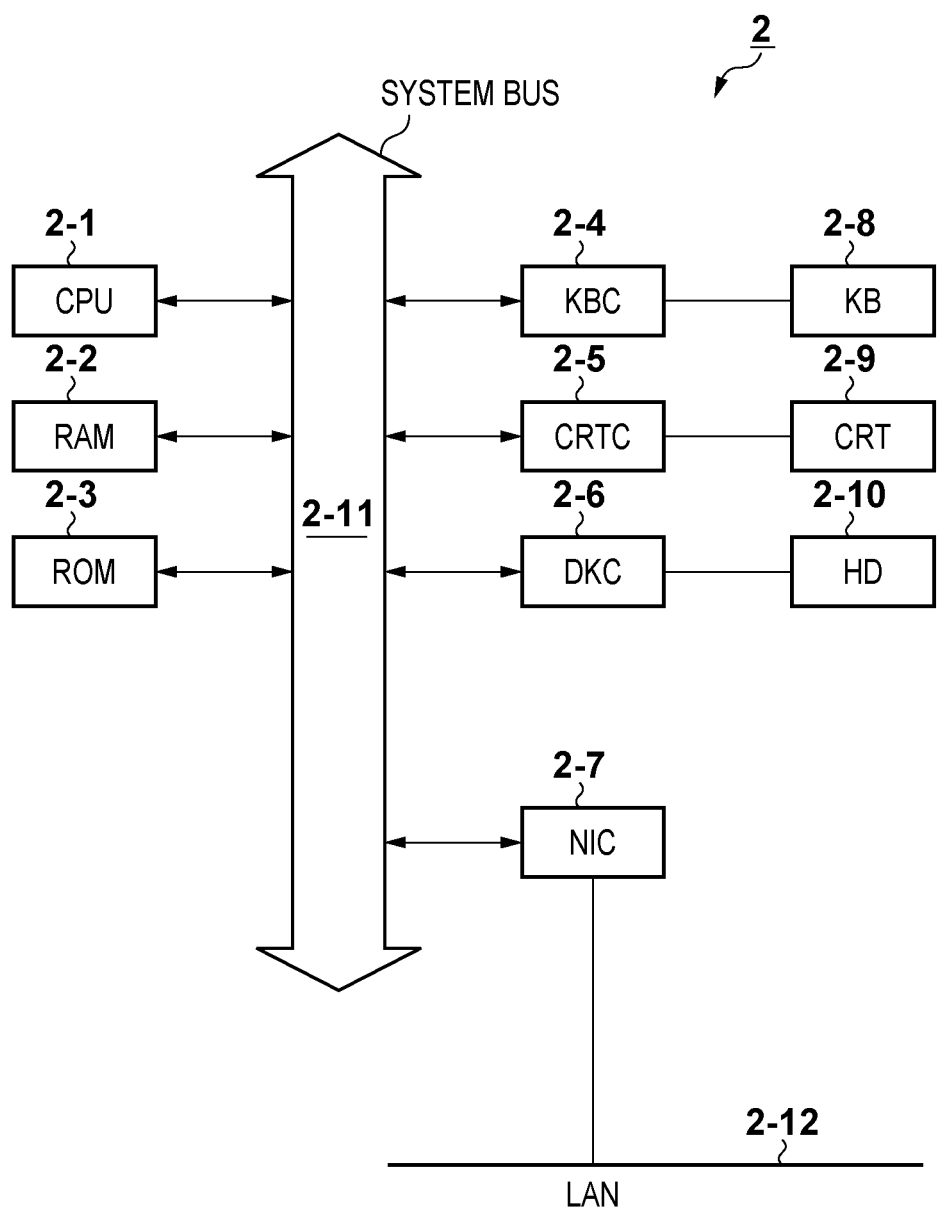
FIG. 2 is a diagram showing an internal configuration of a server device according to the first embodiment of the present invention.

FIG. 2 is a diagram showing an internal configuration of a server device 2 according to the first embodiment of the present invention. The server device 2 includes a CPU 2-1 that executes programs stored in a ROM 2-3 and a RAM 2-2, and the CPU 2-1 centrally controls each device connected to a system bus 2-11. The RAM 2-2 functions as main memory and a work area for the CPU 2-1. The RAM 2-2 also implements backup RAM that stores various setting values while continuously powered by a battery or the like. A keyboard controller (KBC) 2-4 controls key input provided through a keyboard (KB) 2-8. A CRT controller (CRTC) 2-5 controls display on a CRT display (CRT) 2-9. A disk controller 2-6 controls a hard disk (HD) 2-10 that stores user-uploaded print data and various sorts of user data. A network interface card (NIC) 2-7 can communicate with user PCs and various servers via a LAN 2-12.

In this embodiment, the HD may be replaced with a component capable of storing data, such as nonvolatile memory. Communication port setting values may be stored in nonvolatile storage device other than the backup RAM, such as in an HDD.

<Configuration of Cloud Print System>

Figure 3:
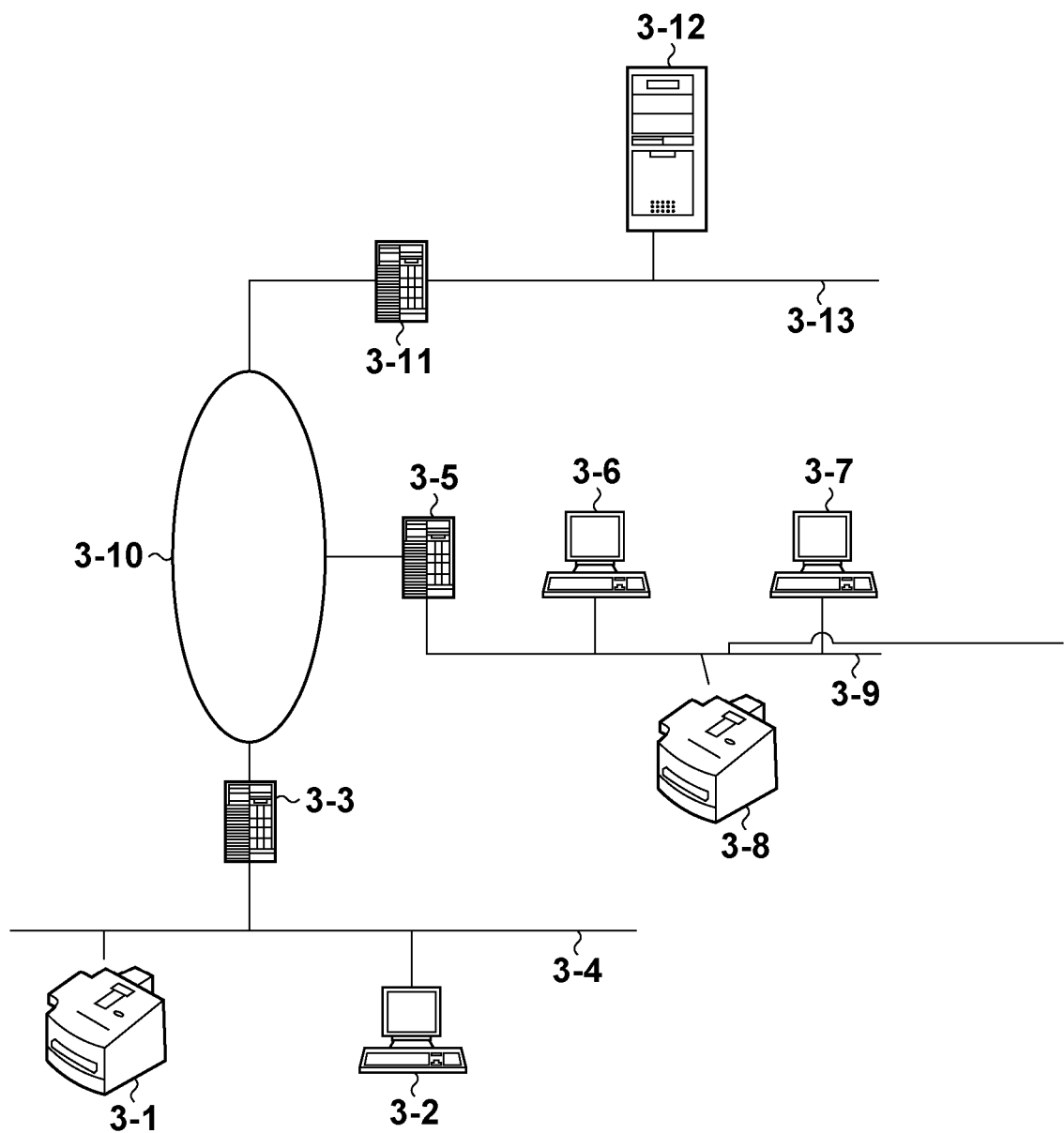
FIG. 3 is a diagram for describing an overall arrangement of a system according to the first embodiment of the present invention.

FIG. 3 is a diagram for describing an overall arrangement of a network print system according to the first embodiment of the present invention. In FIG. 3, print devices 3-1 and 3-8 can receive a print job from a server on the Cloud (hereinafter simply referred to as a server) 3-12 over the Internet 3-10. In this embodiment, a print job contains a set of document data to be printed and a job ticket describing the location and structure of the document in a language such as XML. The print devices 3-1 and 3-8 correspond to the print device 1 in FIG. 1. The server 3-12 corresponds to the server device 2 in FIG. 2. Computers 3-2, 3-6, and 3-7 can upload a print job to the server 3-12 in response to an instruction provided with a user operation. These computers will be referred to as user computers. Routers 3-3, 3-5, and 3-11 are routers between the Internet and respective local networks. Networks 3-4, 3-9, and 3-13 are each a local network connected to the Internet, and are implemented as LANs, for example.

The server, devices, and PCs are not limited to the arrangement in FIG. 3. Rather, one or more servers, devices, and PCs may be combined. The user computers may connect to the server device 3-12 over intranets, for example, instead of the Internet 3-10. In that case, the server 3-12 is not necessarily accessible over the Internet.

<Overview of Print Service>

Figure 4:
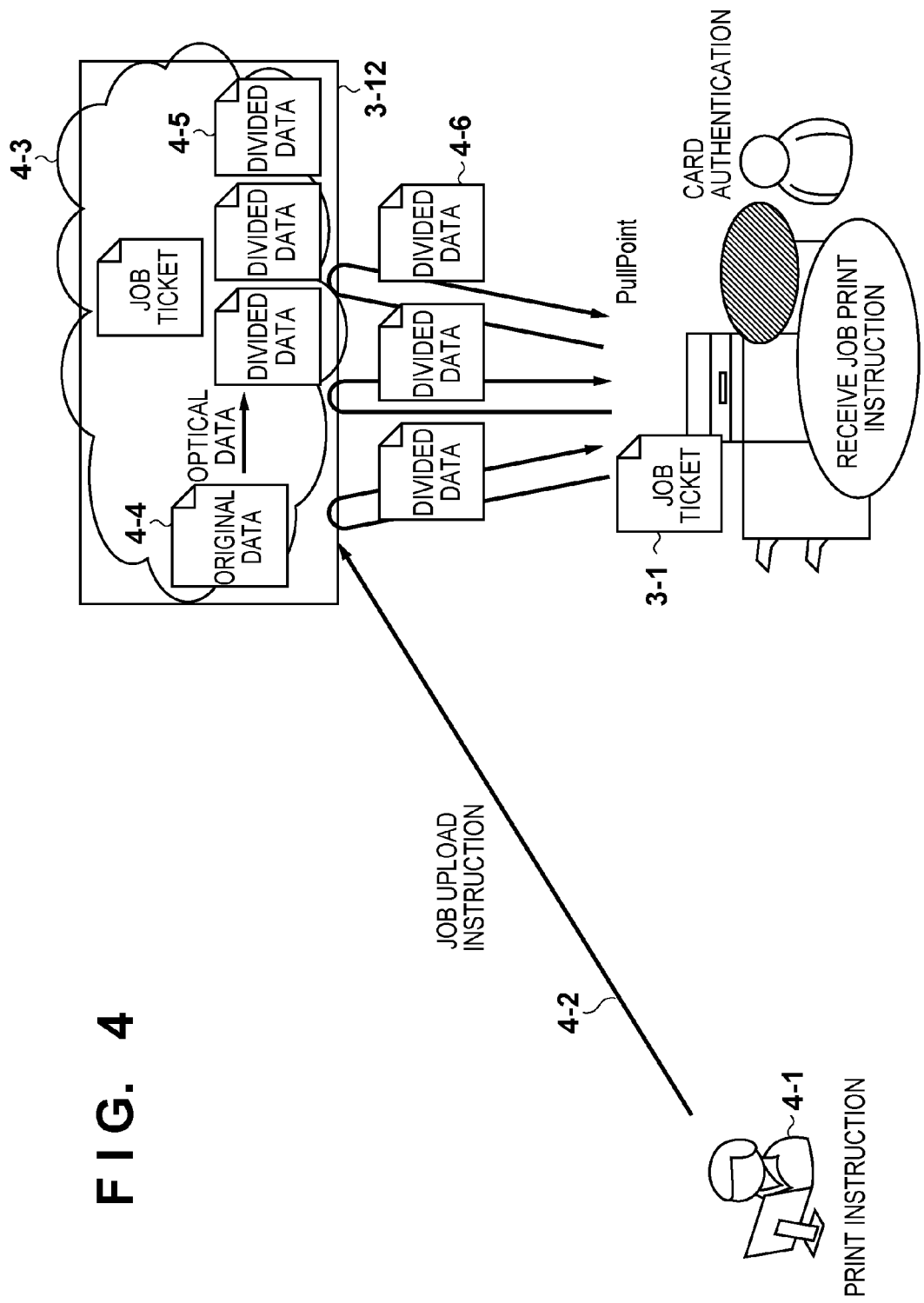
FIG. 4 is a diagram showing details of a general operational flow in the system according to the first embodiment of the present invention.

FIG. 4 is a diagram showing the overview of a general operational flow in the system according to the first embodiment of the present invention. Through a web browser executed on a user PC 4-1, a user inputs an instruction to upload a print job. The user PC 4-1 corresponds to the user computers 3-2, etc. The data upload instruction is transmitted to the server 3-12 on the Cloud (the Internet) via a network line 4-2. A cloud environment 4-3 depicts the presence of various cloud services, including a service provided by the server 3-12. Thus, since services and servers are not in a one-to-one correspondence, the servers may be referred to as a server system. The following description assumes that the print service in this example is provided by the server 3-12. It is to be noted that document data to be printed may be provided by a separate document server or by the server 3-12, or possibly by the user computer.

Data 4-4 is document data to be printed according to the print job transmitted from the user computer 4-1. The data 4-4 is stored as original document data in the server 3-12 on the Cloud. While this document data may be acquired in various ways as mentioned above, description in this embodiment assumes that the document data is acquired from a document server in the Cloud. Divided document data items (or simply divided data) 4-5 are divided data items resulting from dividing the document data 4-4 in the case that the document data 4-4 has a large data size. The document data 4-4 is divided into optimal units for printing with a print device, for example at page breaks at which sheets of a sheet medium are separated. By way of example, in the case of the document layout "2 in 1, two-sided," the document data is divided into units of data for every four pages. The divided document data items are each stored as an independent data file. The order of the divided data items is described in a separately generated job ticket. Since each divided data item is an independent file, a structure description for the data item is recorded at the end of the file in an exemplary case of a PDF file. Connections 4-6 are established for the respective divided data items between the server 3-12 and the print device 3-1 (in this example, printing is performed with the print device 3-1). These connections are provided for an efficient reception process in the case that a print process cannot be performed such as during the calibration of the engine of the print device 3-1. When the print process cannot be immediately started, the print device establishes the connections (sessions): the print device receives the job ticket from the server 3-12 first, and then receives the divided data items while putting priority on performance. It is to be noted that the print job of the original document data may be generated in advance and uploaded, or may be generated by the server according to the uploaded document data. In the case that the document data is divided, the job ticket is also generated for the undivided original document data, and the print jobs are generated and stored.

Although the document data is divided into three in FIG. 4, the number of divided data items is not limited to three. Rather, the number of divided data items may be dynamically changed according to on the size and the job type. Although this example uses the job ticket to record how the data is divided into the divided data items, the job ticket may not be used. Rather, the order of the divided data items may be recorded with serial numbers added to the file names of the divided data items (gazou1.pdf, gazou2.pdf, gazou3.pdf), or both of these recording manners may be combined. In this example, it is assumed that the both recording manners are combined.

Services provided in the cloud environment are provided by servers. One service may be realized with cooperation of several servers, and conversely, one server may provide several services. In order to provide one service to a number of clients, the load to provide the service may be distributed among several servers.

<Software Configuration of Print Device>

Figure 5:
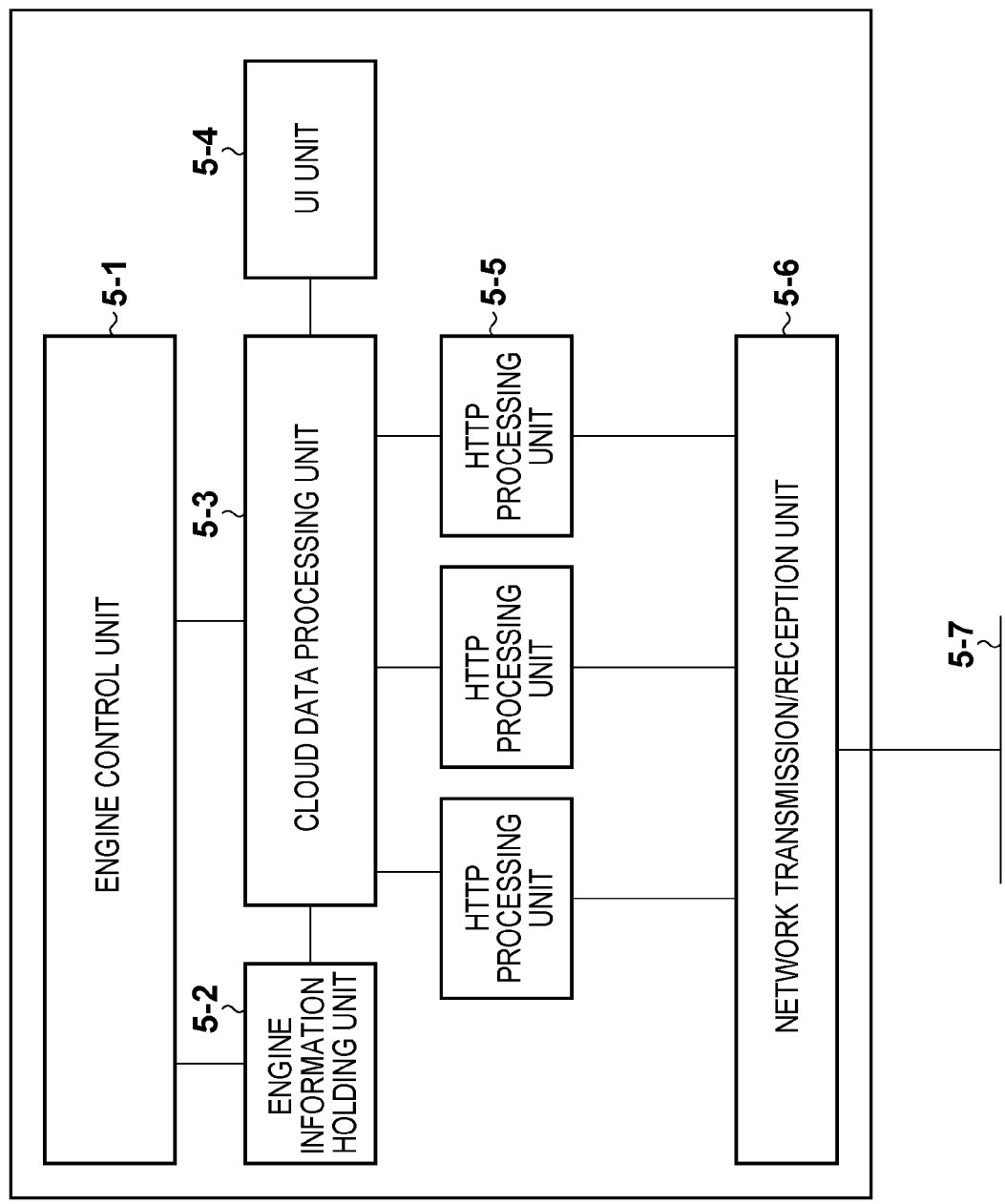
FIG. 5 is a diagram of an internal module configuration in the print device according to the first embodiment of the present invention.

FIG. 5 is a diagram of an internal module configuration in the print device 1 according to the first embodiment of the present invention. An engine control unit 5-1 performs control such as print control for the printer engine and device control. An engine information holding unit 5-2 holds information such as latest engine status information (Ready (printable status), NotReady (unprintable status), and Printing (under-printing status) etc.) from the engine control unit 5-1. A cloud data processing unit 5-3 contacts the server 3-12 on the Cloud to obtain a print job in response to a user operation provided through a UI unit 5-4. HTTP processing units 5-5 can simultaneously process a plurality of tasks. A network transmission/reception unit 5-6 can transmit and receive data to and from a device such as the server 3-12 over a network in response to an instruction from components such as the HTTP processing units 5-5.

Although the HTTP processing units 5-5 are illustrated in FIG. 5, any components capable of communication on the Internet may be employed. For example, processing units that support other protocols such as FTP may be employed. Although the cloud data processing unit 5-3 is illustrated in FIG. 5, any non-cloud components capable of communication with the server may be employed.

<Software Configuration of Server Device>

Figure 6:
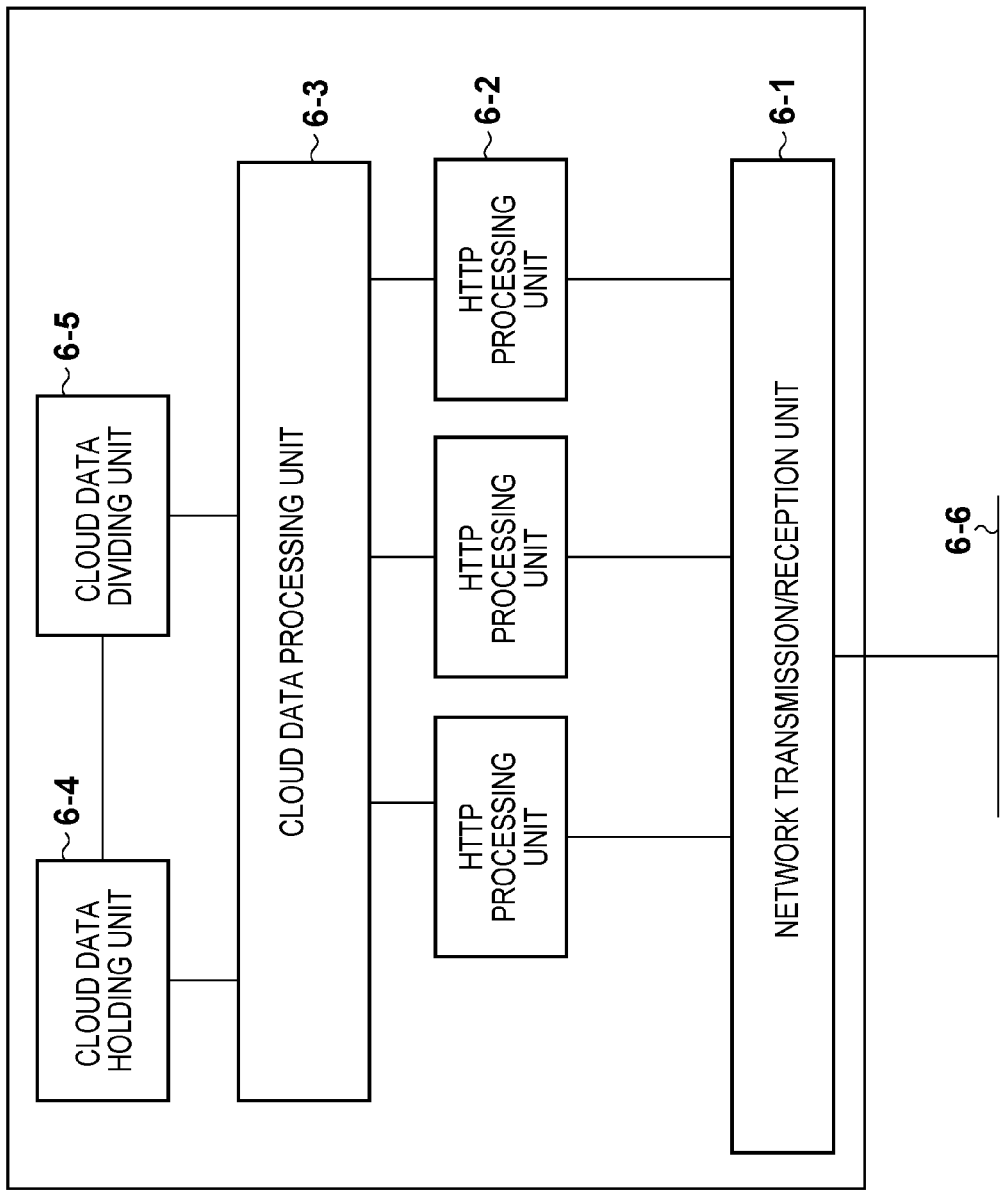
FIG. 6 is a diagram of an internal module configuration in the server device according to the first embodiment of the present invention.

FIG. 6 is a diagram of an internal module configuration in the server device 2 according to the first embodiment of the present invention. A network transmission/reception unit 6-1 receives a print job uploaded from a user computer to HTTP processing units 6-2 or transmits a print job from the HTTP processing units 6-2 to the print device 1. A cloud data processing unit 6-3 handles data from the HTTP processing units 6-2 and data to the HTTP processing units 6-2. If the size of the data exceeds a threshold (for example, 1 MByte), the cloud data processing unit 6-3 passes the processing to a cloud data dividing unit 6-5. The cloud data dividing unit 6-5 divides the data as in FIG. 7. The divided data items are passed to a cloud data holding unit 6-4, in which the data items are stored. The cloud data holding unit 6-4 also stores the original undivided data along with the divided data items.

Although the HTTP processing units 6-2 are illustrated in FIG. 6, any components capable of communication on the Internet may be employed. For example, components that support other protocols such as FTP may be employed. Although the cloud data processing unit 6-3 is illustrated in FIG. 6, any non-cloud components capable of communication via the HTTP processing units 6-2 may be employed.

Although the size threshold is assumed as 1 MByte, the threshold may be set to any size and may be changed by an operator.

<Exemplary Data>

Figure 7A:
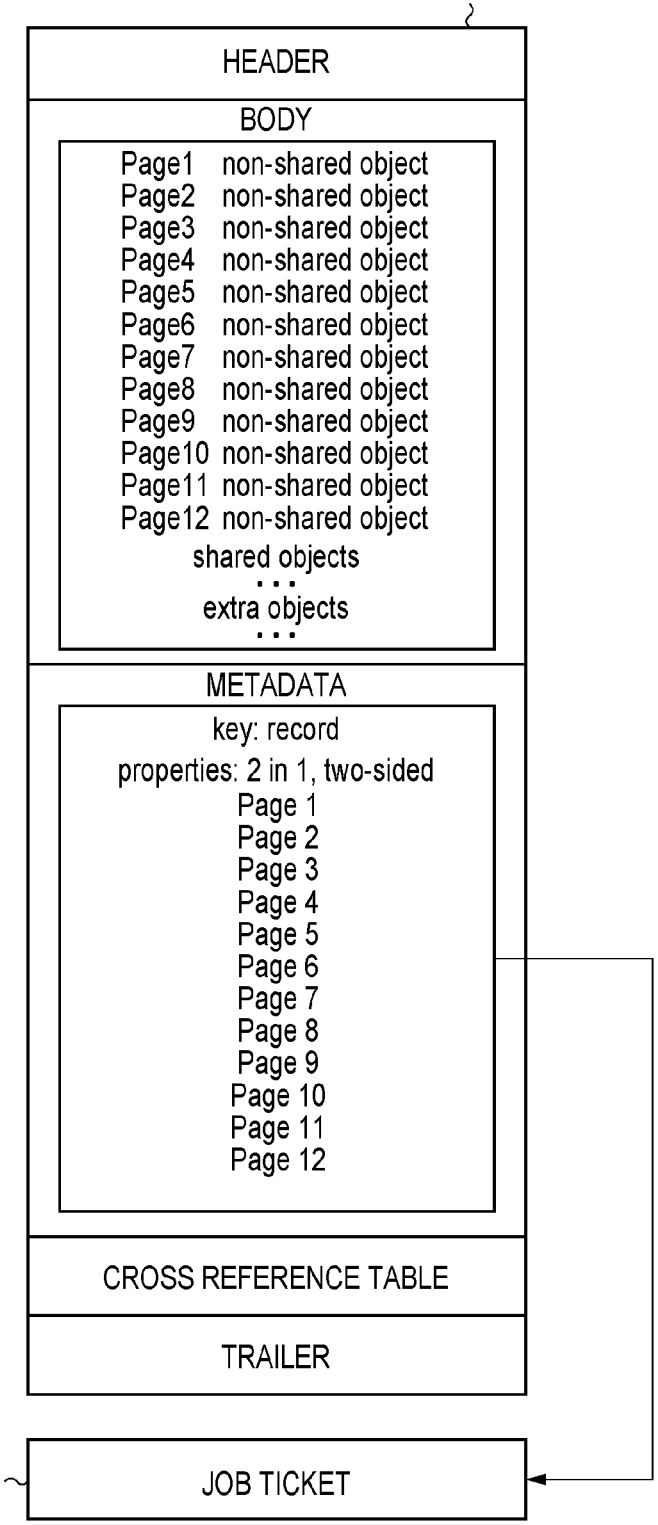
FIGS. 7A and 7B are diagrams showing an example of a PDF file and a job ticket contained in a print job according to the first embodiment of the present invention.
Figure 7B:
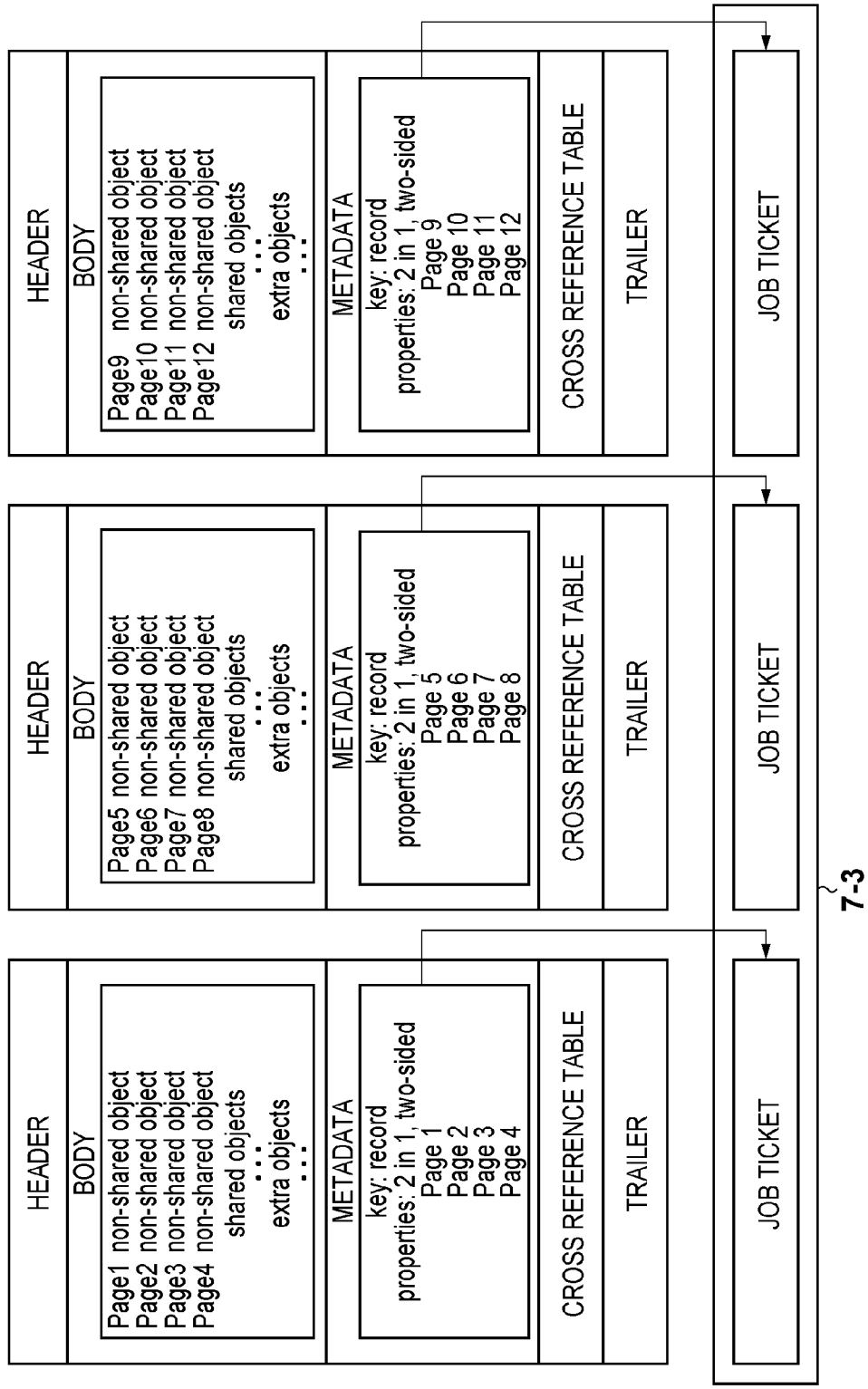

FIGS. 7A and 7B are diagrams showing an example of a PDF file and a job ticket that are contained in a print job according to the first embodiment of the present invention.

FIG. 7A shows a print job 71 to be analyzed by the server device 3-12 in FIG. 6. The print job 71 contains a PDF file 7-1 and a job ticket 7-2. The PDF file 7-1 includes a header, a body, metadata, a cross-reference table, and a trailer. The header is information described in the first line of the PDF file 7-1. Exemplary information in the header includes a PDF version number. The body contains objects that represent the content of a document. The objects include fonts, pages, and images that constitute the document. In the example shown in the PDF file 7-1, the body describes non-shared objects for Page 1 to Page 12. The body also describes shared objects that are shared among all the pages, and extra objects. The metadata is a dictionary object that represents a key for certain pages. The key indicates print properties of the print job. That is, the metadata is print property information about the print job. The key has reference information, which indicates, for example, objects in the body that correspond to the print properties indicated by the key. The reference information also indicates, for example, a job ticket that contains print setting information corresponding to the print properties indicated by the key. In the case that the reference information indicates a job ticket, the metadata and the print setting information in the job ticket are the print property information about the print job. Information about correspondences between the objects in the PDF file and the locations of the objects is stored in advance in the cross-reference table. Byte offsets (an example of location information) of the metadata and the objects from the beginning of the file are also stored in advance in the cross-reference table. By searching the cross-reference table, the objects in the PDF file can be randomly accessed. The trailer is information described at the end of the PDF file. For example, the trailer has location information about the cross-reference table, and reference information to a root object for the PDF file. An application program that deals with PDF data is implemented to access the trailer first. This type of application refers to the location information about the cross-reference table in the trailer and then accesses the cross-reference table. On the basis of the cross-reference table, the offsets of the objects are acquired to allow random accesses to the objects. This is also the case in the cloud data processing unit 6-3 and in the print process by the print device 1. When PDF data is printed, the entire PDF data is downloaded and the trailer is accessed first.

When PDF data, or a print job for printing the PDF data is uploaded, the cloud data processing unit 6-3 determines whether the data size exceeds a threshold. If it is determined that the data size exceeds the threshold, the PDF data is passed to the cloud data dividing unit 6-5. The cloud data dividing unit 6-5 accesses the trailer of the passed PDF file and refers to the location of the cross-reference table. The cloud data dividing unit 6-5 obtains the byte offset of the metadata and obtains the key in the metadata. If it is determined that the obtained key indicates record information, the cloud data dividing unit 6-5 searches a record database. If it is determined that the record database contains properties of the record in the metadata, the cloud data dividing unit 6-5 identifies page groups corresponding to the properties of the record on the basis of the reference information corresponding to the properties of the record. In this example, the property values are "2 in 1, two-sided." Therefore, the identified page groups, which are units of four pages on a per-sheet basis, are determined as dividing units for the print job.

Thus, a page group from Page 1 to Page 4, a page group from Page 5 to Page 8, and a page group from Page 9 to Page 12 are determined as the dividing units. The PDF file is divided according to these dividing units, and print jobs for printing the divided data items are generated. For example, print jobs as shown in FIG. 7B are generated.

As shown in FIG. 7B, with regard to the job ticket, settings for the three divided data items are all described in one job ticket (7-3). The content of the job ticket will be described with reference to FIG. 8. Alternatively, a plurality of job tickets for the respective divided data items may be generated.

Although the above example has been illustratively described for PDF, the present invention may also be adapted to PDLs other than PDF that allow printing to be started after the entire print data is stored in a print device.

<Exemplary Job Ticket>

FIG. 8 is a diagram showing an example of a job ticket in which a list of divided jobs is described according to the first embodiment of the present invention.

RunList 8011, 8012, and 8013 each indicate the print order. The divided jobs have constituted an undivided PDF file in ascending order. FileSpec 8021, 8022, and 8023 each indicate a file name of a file to be printed, and each file is actually stored with this file name in the server 3-12. Here, the file names are gazou1.pdf, gazou2.pdf, and gazou3.pdf, respectively. Such a job ticket is generated by the cloud data dividing unit 6-5 according to the division of the PDF data.

Although the above example has been described for the XML-based job ticket, the job ticket may be in other forms, such as text-based, capable of describing a list of jobs. If the job is not divided, a single file name is described in the job ticket in the above example.

<Exemplary Pull Print Sequences>

Figure 9:
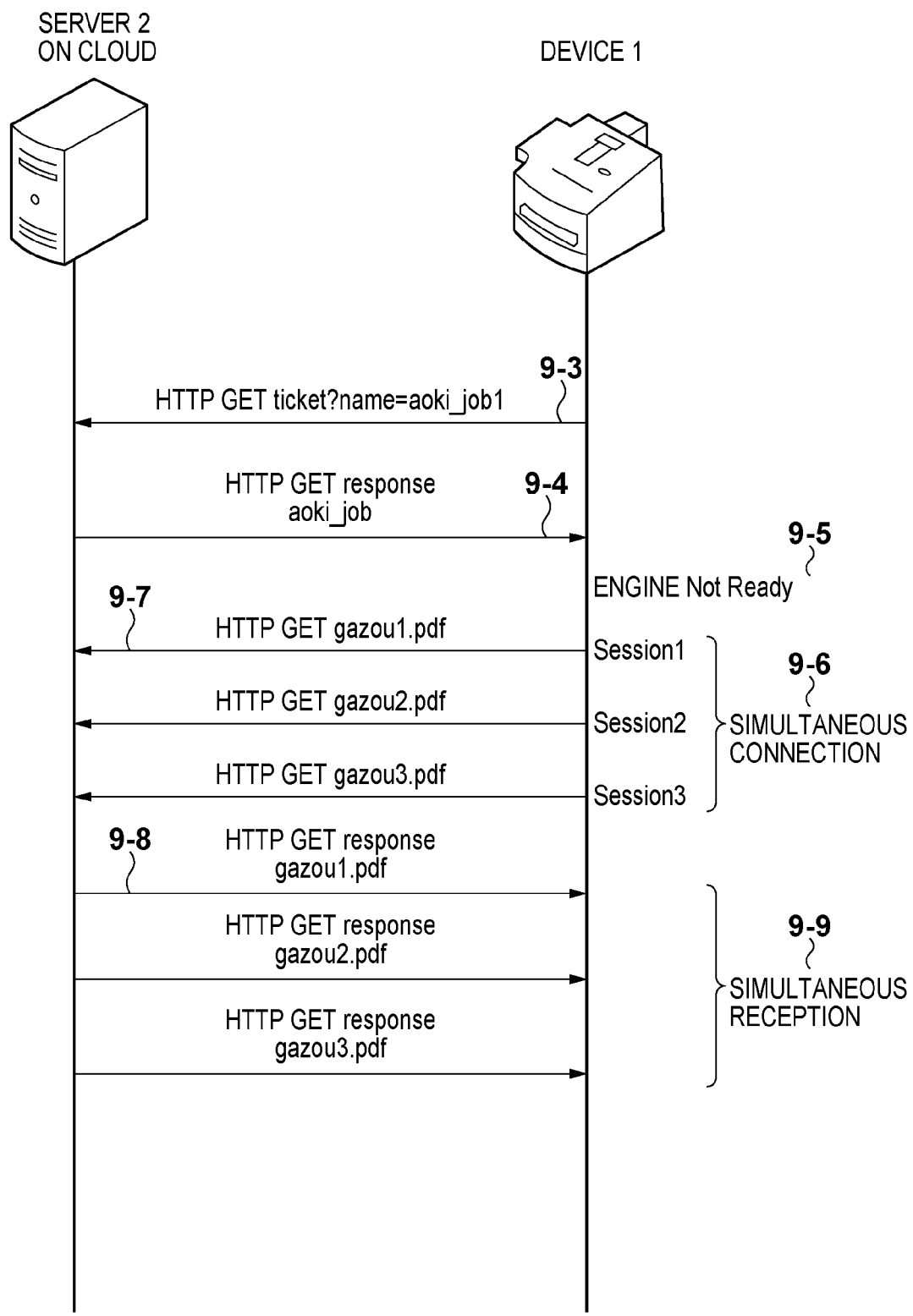
FIG. 9 is a server/client sequence diagram according to the first embodiment of the present invention.

FIG. 9 is a sequence diagram of the server 2 and the print device 1 according to the first embodiment of the present invention, and particularly illustrates an example in which the engine of the print device 1 is "Not Ready." The print device 1 may also be referred to as a client. The print device 1 is a device that receives print data from the server 2 and performs printing. A job request message 9-3 is a request for a job ticket from the device to the server, in which an owner ID and a print job ID are specified. Here, the owner ID is aoki and the job ID is job1. A job response message 9-4 is a response to the job request message 9-3, in which a job ticket as in FIG. 8 is transmitted from the server 2 to the print device 1. In a process 9-5, the cloud data processing unit 5-4 refers to data in the engine information holding unit 5-3 to determine that the engine is "Not Ready." Monitoring of the engine status may be triggered by an interruption from the engine or may be based on polling. A process 9-6 indicates that division information obtained from the job ticket is referred to and sessions corresponding to the number of divided data items are established to request the divided data items simultaneously (i.e., in parallel). In each session, an HTTP request 9-7 is transmitted by specifying a data location (URI) obtained from the job ticket. A process 9-9 indicates that the three divided data items are simultaneously received in response to the HTTP requests in the respective sessions. In this manner, if the print function of the print device is unavailable, the divided data items are downloaded in parallel in the sessions corresponding to the number of divided data items.

Although the above example has illustrated the three sessions connected simultaneously, it is to be understood that the number of sessions is not limited to three. Although the above example has illustrated the sequence of obtaining the job ticket, a job list instead of the job ticket may be obtained with an HTTP query or a SOAP protocol. An upper limit may be set for the number of divided data items downloaded in parallel. In that case, the download is controlled so that the number of sessions does not exceed the upper limit.

Figure 10:
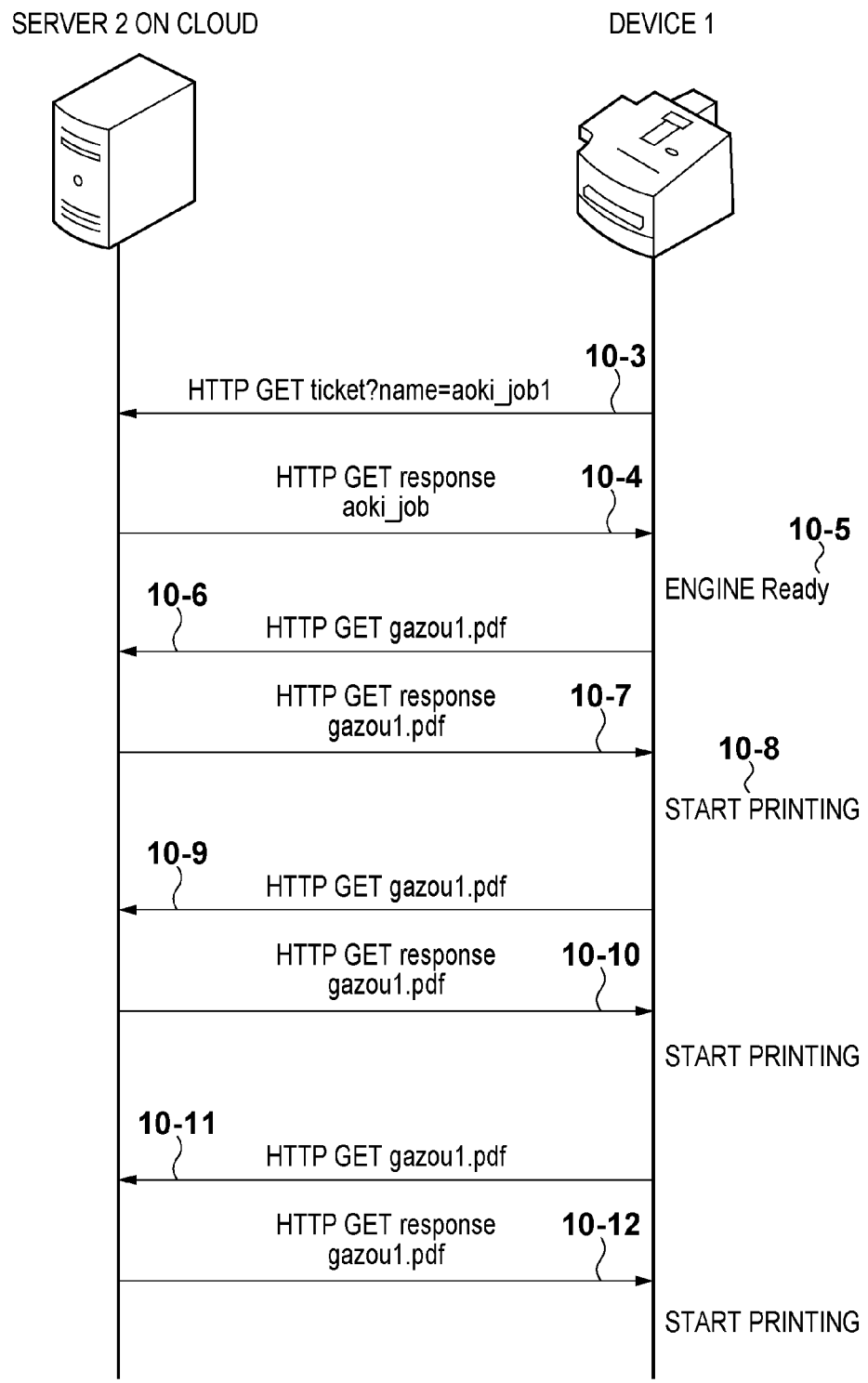
FIG. 10 is a server/client sequence diagram according to the first embodiment of the present invention.

FIG. 10 is a sequence diagram of the server 2 and the print device 1 according to the first embodiment of the present invention, and particularly illustrates an example in which the engine of the print device 1 is "Ready." A job request message 10-3 is a request for a job ticket from the device to the server, in which an owner ID and a print job ID are specified. Here, the owner ID is aoki and the job ID is job1. A job response message 10-4 is a response to the job request message 10-3, in which a job ticket as in FIG. 8 is transmitted from the server 2 to the print device 1. A process 10-5 is a process in which the cloud data processing unit 5-4 refers to data in the engine information holding unit 5-3 to determine that the engine is "Ready." Monitoring of the engine status may be triggered by an interruption from the engine or may be based on polling. A message 10-6 is an HTTP request message for requesting a first divided data item. In response to this, the first divided data item is returned as an HTTP response message 10-7. The print device 1 starts printing the downloaded first divided data item in a process 10-8. At the same time, a request for a next divided data item is transmitted as an HTTP request message 10-9. In response to this, the divided data item is returned as an HTTP response message 10-10. Upon completion of the reception, a request for a next divided data item is transmitted as an HTTP request message 10-11. In response to this, the divided data item is returned as an HTTP response message 10-12. In this manner, the request and the response are repeated until all the divided document data items are received in the order as in the original data. The print process by the print device 1 is started after the completion of receiving the first divided data item. Thereafter, the print process is performed asynchronously with the reception process. However, if the reception rate cannot keep up with the print speed, a print underrun may occur. In that case, the time of the occurrence of the print underrun is a synchronization point. Advantageously, in this embodiment, the print quality is not significantly affected because the original document data is divided on the basis of separation between sheets of printed paper.

Although the above example has illustrated the three data items, it is to be understood that the number of data items is not limited to three. Although the above example has illustrated the sequence of obtaining the job ticket, a job list instead of the job ticket may be obtained with an HTTP query or a SOAP protocol.

<Processing by Print Device>

Figure 11:
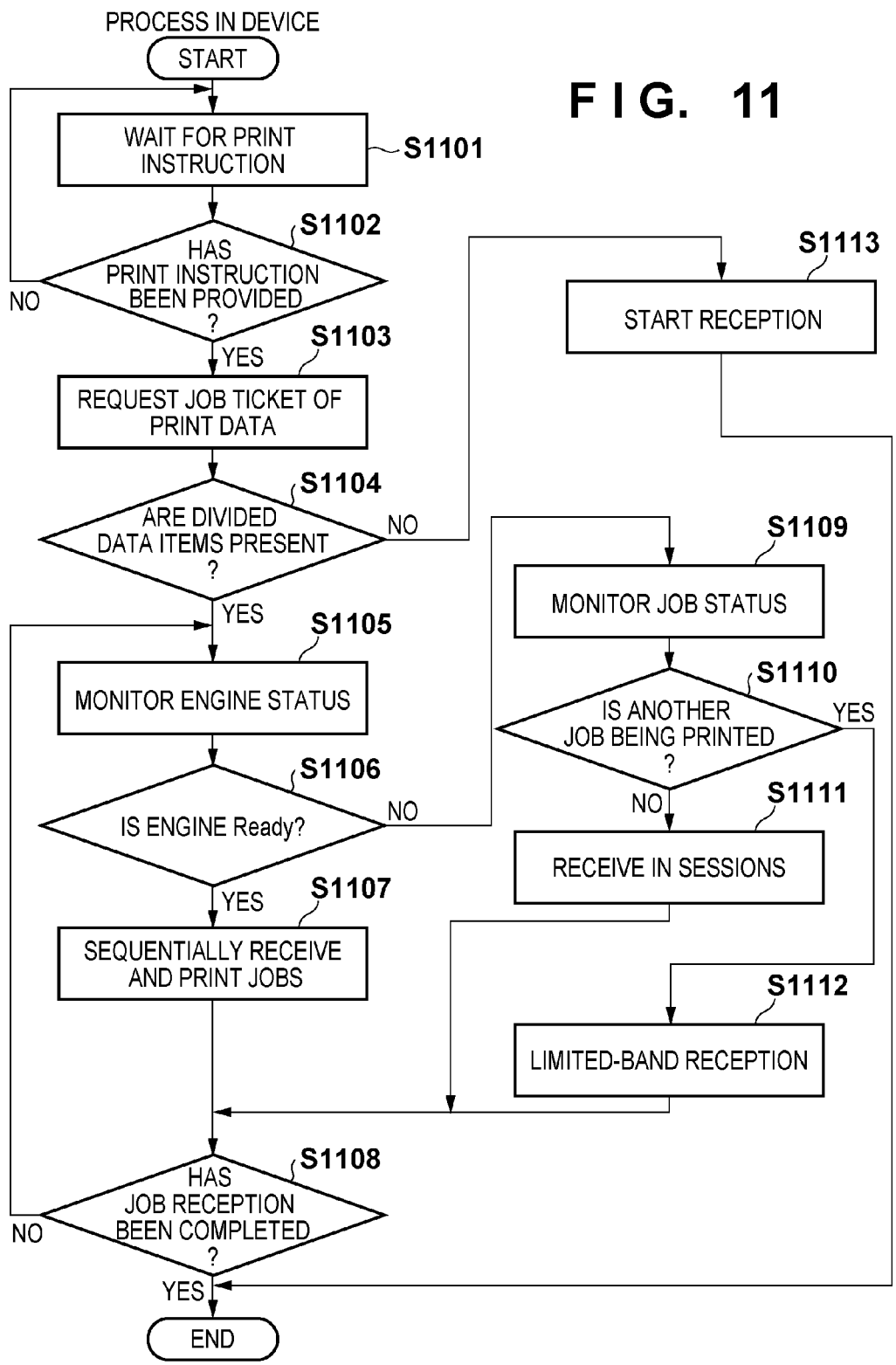
FIG. 11 is a flowchart in the device that receives print data according to the first embodiment of the present invention.

FIG. 11 is a flowchart in the print device that receives a print job according to the first embodiment of the present invention. Operation of the print device in this embodiment will be described below with reference to FIG. 11, which shows a procedure of a program executed by the CPU of the print device.

In S1101, the CPU 1-1 waits for input of a print instruction from a user. In S1102, the CPU 1-1 determines whether the print instruction has been input. If it is determined that the print instruction has been input, the process proceeds to S1103. Otherwise, the process returns to S1101.

In S1103, the CPU 1-1 requests a job ticket of document data to be printed from the server 2. In S1104, the CPU 1-1 refers to the content of the job ticket received from the server 2 to determine whether divided data items are present. For example, it can be determined that the document data is divided if a plurality of document files are referred to in the job ticket. Alternatively, it can be determined that the document data is divided if the job ticket contains tags indicating the order as in FIG. 8. If it is determined that divided data items are present, the process proceeds to S1105. Otherwise, the process proceeds to S1113.

In S1105, the CPU 1-1 obtains information indicating the engine status. In S1106, the CPU 1-1 refers to the obtained information to determine whether the engine is "Ready." If it is determined that the engine is "Ready," the process proceeds to S1107. Otherwise, the process proceeds to S1109. In S1107, following the sequence in FIG. 10, the CPU 1-1 sequentially receives divided print jobs, i.e., the divided data items, starting from the first divided data item while printing the received print jobs. In S1108, the CPU 1-1 determines whether the job reception has been completed. If it is determined that the job reception has been completed, the process terminates. Otherwise, the process returns to S1105.

In S1109, the CPU 1-1 obtains and refers to information indicating the job state. In S1110, from the obtained information, the CPU 1-1 determines whether another job is being printed. If it is determined that another print job is being executed, the process proceeds to S1112. Otherwise, the process proceeds to S1111. In S1111, the CPU 1-1 establishes sessions and receives the divided data items in parallel. In S1112, the CPU 1-1 performs limited-band reception.

In S1113, the CPU 1-1 receives undivided data. Upon completion of the reception, the CPU 1-1 prints the data and terminates the process. The limited-band reception may be performed, for example, by setting an upper limit of the number of sessions processed in parallel. In that case, S1111 may also be subjected to the band limitation. Alternatively, the start of new download may be delayed for a certain period and then the step of S1111 may be begun.

The downloaded print jobs may be discarded after the completion of the printing or may be retained. For example, the user may select in advance to discard or retain the print job and save the selected setting, so that the setting can be referred to after the completion of the printing to determine how to treat the print jobs.

<Upload Procedure in Server>

Figure 12:
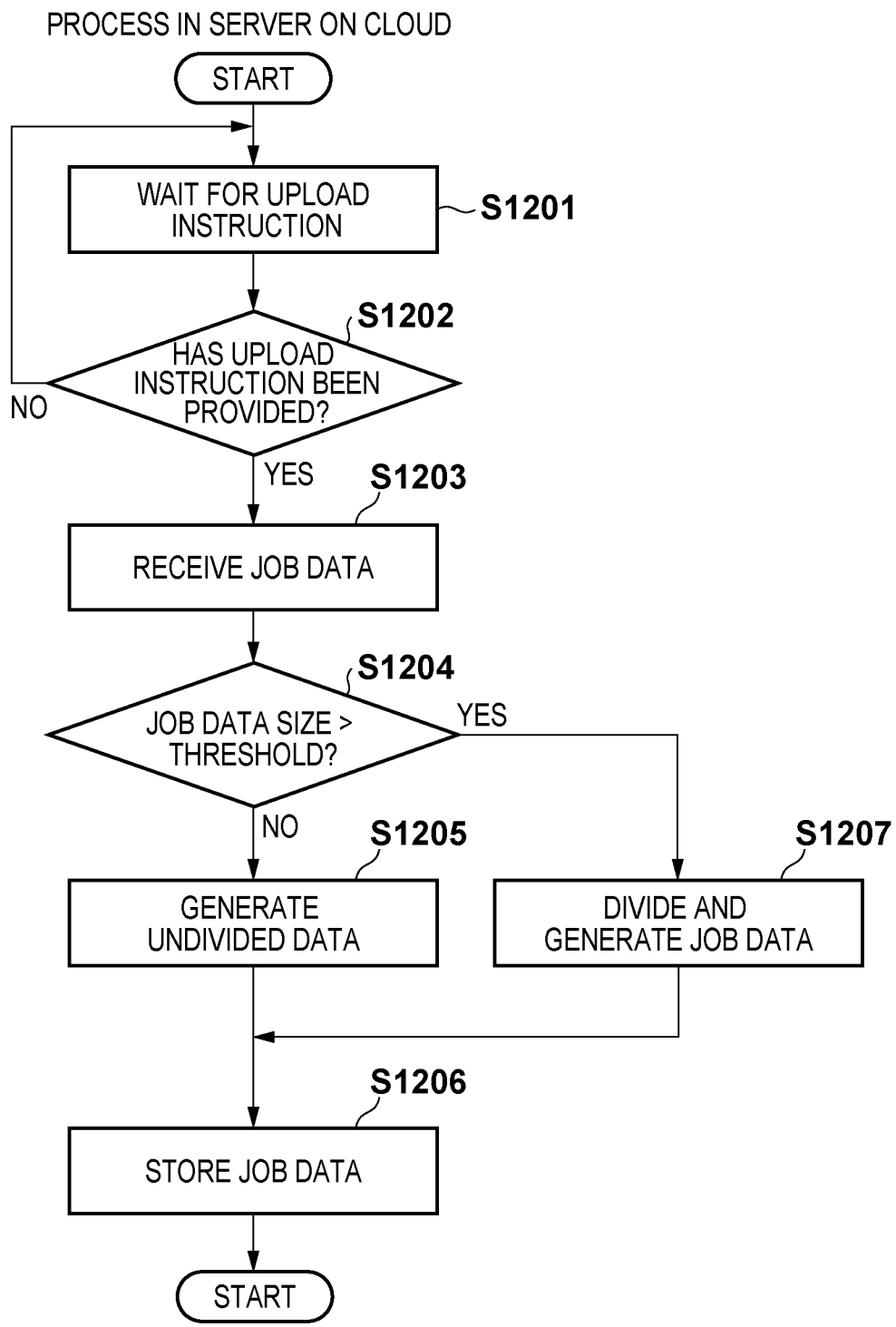
FIG. 12 is a flowchart in the server on the Cloud that receives print data according to the first embodiment of the present invention.

FIG. 12 is a flowchart in the server 2 on the Cloud that receives document data to be printed according to the first embodiment of the present invention. In S1201, the CPU 2-1 waits for a document data upload instruction from a user terminal. In S1202, the CPU 2-1 determines whether the upload instruction has been provided. If it is determined that the upload instruction has been provided, the process proceeds to S1203. Otherwise, the process returns to S1201. In S1203, the CPU 2-1 receives document data. If the upload instruction indicates that the document data should be obtained from a document server, the document data is requested and acquired from the specified document server. The acquired original document data is stored in the HDD.

In S1204, the CPU 2-1 determines whether the size of the document data exceeds a predetermined threshold (e.g., 1 MByte). If it is determined that the threshold is exceeded, the process proceeds to S1207. Otherwise, the process proceeds to S1205. In S1205, the CPU 2-1 generates a print job for printing the undivided document data (i.e., generates a job ticket). In S1206, the CPU 2-1 stores the print job in the HDD.

In S1207, the CPU 2-1 divides the document data and generates a print job for each divided data item. For each divided document data item, information for identifying the order of the document data item is internally or externally generated. As described with reference to FIG. 7A, the document data is divided on the basis of separation between sheets of a printed sheet medium by referring to the content of the document data and the setting information. Specifically, with reference to the setting of one-sided/two-sided printing and the page layout setting, the number of pages laid out on one sheet is taken as a candidate for the dividing unit. That is, for one-sided printing, the number of pages laid out on one side of a sheet and integer multiples of that number are candidates of where the document data is divided. For two-sided printing, the number of pages laid out on both sides of a sheet and integer multiples of that number are candidates of where the document data is divided. In FIGS. 7A and 7B, the dividing is on a per-sheet basis, so that the job is divided at the intervals of the number of pages laid out on one sheet. However, the job may be divided at the intervals of the number of pages laid out on a plurality of sheets. The number of sheets (i.e., the dividing unit) depends on a tradeoff between the transfer rate in downloading and the print rate. Alternatively, the threshold used to determine whether or not to divide the document data may be used as a criterion of the size of divided data items. In that case, the above-described dividing unit is used to divide the document data into units of a maximum size not larger than the threshold.

The threshold is not limited to 1 MByte but may be other values. The threshold may also be changeable by an operator of the server or an operator of the user terminal. Thus, once the document data is uploaded, the document data is divided or not divided depending on the size of the document data.

The print job uploaded in the above manner is downloaded and executed by the print device according to the procedure in FIG. 11. A process performed by the server 2 at the time of downloading is to transmit the print job to the print device in response to the request from the print device 1.

This embodiment is also applicable to a case in which the document data itself is not uploaded from the user terminal but is read from a document server. In this case, the server 3-12 (referred to as a print server) reads, from the document server, the document data relevant to the print job for which the upload instruction has been provided. The server 3-12 then divides and stores the read document data. That is, this embodiment is applicable to either the case in which the document data is uploaded from the user terminal or the case in which the document data is uploaded from a separate document server.

Although this embodiment implements the generation of the print job and the storage of the generated job in the same server, the two processes may be performed in different servers. In that case, a group of servers that function as the server 3-12 in this embodiment is referred to as a server system, for example.

Thus, for a print job having a certain size or above and containing document data incapable of being printed unless the entire document data is downloaded, the print job is divided in advance in the server. This allows the print process and the download process to be performed in parallel once the first divided job is downloaded. Therefore, the time after the user inputs the print instruction and before the printing is started, or what is called the first print time is short. In addition, the time to complete the printing can be reduced.

Further, since the job is divided on a printed paper (sheet) basis, the divided jobs can be printed in the same form as the original print job.

Further, since the print job is divided, the divided jobs can be downloaded in parallel when the print process cannot be performed (in neither the printable status nor the under-printing status). Thus, dividing the print job enables resources of the print device to be preferentially allocated to the download process, so that the document data can be downloaded ahead of the printing. For example, when the print device returns to the Ready status, execution of the downloaded print jobs can be started. Since the download has been quickly completed, download of the next print job can be immediately started in response to an instruction to execute the next print job. If another job is being printed, the reception band can be limited to preferentially allocate the resources to the ongoing print process.

Second Embodiment

Next, a second embodiment of the present invention will be described. The second embodiment is a variation on the first embodiment and is similar to the first embodiment except for points to be described below.

FIG. 13 is an example of a UI screen of the print device 1 according to the second embodiment of the present invention. A UI 13-1 displays a list 13-2 of data residing in the server 3-12 on the Cloud and printable with the print device. For example, the list is displayed on the basis of a response to a request sent to the server 13-2 for a list of jobs printable with the print device before the procedure shown in FIG. 9 or 10. The user may select data from the list and press a Print button 13-3. The print device then obtains a job for printing the selected data and starts printing. It is to be noted that the document data list shows undivided original document data. If the selected data is divided, a job ticket generated for the divided document data items is transmitted to the print device.

If the user selects data from the list and presses a Print and Store button 13-4, an instruction to store the data in a BOX after starting printing is made. If the user presses a Store button 13-5, the job data is stored in the BOX without being printed. The BOX is a print job storage area provided in the print device. Print jobs stored in the BOX are accessible from both the print device and other authorized devices connected over a network or the like.

Although this example describes the button for printing the job data, the button for printing and storing the job data in the BOX, and the button for storing the job data in the BOX, this is not limiting.

FIG. 14 is a flowchart in the device that receives print data according to the second embodiment of the present invention. Operation of the print device in this embodiment will be described below with reference to FIG. 14.

In S1401, the CPU 1-1 waits for a print instruction from the user. In S1402, the CPU 1-1 determines whether the print instruction has been input. It is to be understood that this waiting may be based on polling or on an interruption. If it is determined that the print instruction has been input, the process proceeds to S1403. Otherwise, the process returns to S1401. According to FIG. 13, the print instruction is provided through the Print button 13-3 or the Print and Store button 13-4. If the Print and Store button has been pressed, the fact that Print and Store button has been pressed is stored. In S1403, the CPU 1-1 requests a job ticket of the selected document data. In S1404, the CPU 1-1 receives the job ticket and determines whether or not the document data is divided. If it is determined that the document data is divided, the process proceeds to S1405. Otherwise, the process proceeds to S1415.

In S1405, the CPU 1-1 obtains the engine status at this point. In S1406, the CPU 1-1 determines whether the obtained engine status is "Ready." If it is determined that the engine is in the "Ready" status, the process proceeds to S1407. Otherwise, the process proceeds to S1411. In S1407, the CPU 1-1 receives divided jobs in the order as in the original document data, following the sequence in FIG. 10.

As each divided job is received and the turn of the job comes, the job is sequentially printed.

In S1408, the CPU 1-1 determines whether or not the pressed button is the Print and Store button in FIG. 13 (i.e., whether it is simply the Print button). If it is determined that the pressed button is the Print and Store button, the process proceeds to S1410. Otherwise, the process proceeds to S1409. This determination is made by referring to the information stored by the print device indicating that the Print and Store button has been pressed. In S1409, the CPU 1-1 determines whether the job reception has been completed. If it is determined that the job reception has been completed, the print process sequence terminates. Otherwise, the process returns to S1405. In S1410, the print job is stored. Since the divided print jobs have been downloaded in this case, the undivided original print job is downloaded anew and stored. For downloading, the print device needs to request the original document data from the server by specifying the file name of the document data. Therefore, for example, it is predetermined that the file names of the divided document data items are created by adding serial numbers to the file name of the original document. In this manner, the file name of the original document data can be obtained by deleting a suffixed number from a file name described in the job ticket as shown in FIG. 8 obtained at the time of printing, so that the original document file can be requested. It is to be understood that other ways may be used to obtain the file name of the original document data from the server.

In S1411, the CPU 1-1 obtains and refers to the job state. In S1412, from the obtained job state, the CPU 1-1 determines whether another job is being printed. If it is determined that another job is being printed, the process proceeds to S1414. Otherwise, the process proceeds to S1413. In S1413, the CPU 1-1 receives divided data items in sessions in parallel. In S1414, the CPU 1-1 performs limited-band reception, which is performed as described in the first embodiment. In S1415, the CPU 1-1 receives undivided data. Upon completion of the reception, the CPU 1-1 prints the data. When the printing is completed, in S1416, the CPU 1-1 determines whether the print instruction has specified Print and Store, in which case the downloaded print job is stored.

If the pressed button is the Store button 13-5 for storing the data without printing, the undivided original print job is downloaded and stored. In this example, the undivided original document data is downloaded from the server to the print device after the completion of the printing (S1410). Alternatively, information indicating that Print and Store has been specified for the job may be included in the request transmitted from the print device. Then, the divided jobs and the undivided original document data may be downloaded at the same time.

Thus, the print job (i.e., the set of the job ticket and the document data) provided by the server 13-2 can be printed and also stored in the print device. The stored print job is the undivided original print job, even if the divided print jobs have been downloaded at the time of printing. This enables restraining the data size overhead due to the dividing and also facilitates the management of the print job.

Although the above embodiments have been described for the print process, the divided download of the print job can also be applied to processes other than the print process, such as a display process and editing process for document data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-195059 filed Aug. 31, 2010, which is hereby incorporated by reference herein in its entirety.

What is claimed is:

1. A network print system including a print device and a server system,
the server system comprising:
a dividing unit, configured to divide an uploaded original document file into a plurality of document files if the original document file has a data size exceeding a threshold;
a generating unit, configured to generate a job ticket for printing the plurality of divided document files;
a saving unit, configured to save the plurality of divided document files and the job ticket as a print job; and
a transmitting unit, configured to transmit the saved job ticket in response to a request from the print device, and
the print device comprising:
a request unit, configured to transmit, upon input of a print instruction to print the original document file, the request to the server system; and
a receiving unit, configured to, when the print device is in a printable status, receive from the server system the plurality of divided document files in an order described in the job ticket received from the server system in response to the request,
wherein the receiving unit, when the print device is in an unprintable status, receives from the server system the plurality of divided document files in parallel regardless of the order described in the job ticket.

2. The network print system according to claim 1, wherein a structure of the document file is described at the end of the document file.

3. A method for downloading document data in a network print system including a print device and a server system, the method comprising:
the server system dividing an uploaded original document file into a plurality of document files if the original document file has a data size exceeding a threshold;
the server system generating a job ticket for printing the plurality of divided document files;
the server system saving the plurality of divided document files and the job ticket as a print job;
upon input of a print instruction to print the original document files, the print device transmitting the request to the server system;
the server system transmitting the saved job ticket in response to the request from the print device;
when the print device is in a printable status, the print device receiving from the server system the plurality of divided document files in an order described in the job ticket received from the server system in response to the request, wherein, when the print device is in an unprintable status, the print device receives from the server system the plurality of divided document files in parallel regardless of the order described in the job ticket.

4. A server system connected with a print device and including a storage unit for saving externally an uploaded document file described in PDF (Portable Document Format), the server system comprising:

a dividing unit, configured to divide the uploaded document file into a plurality of document files, a generating unit, configured to generate a job ticket for printing the plurality of divided document files;

a saving unit, configured to save the plurality of divided document files and the job ticket in the storage unit; and a transmitting unit, configured to transmit the plurality of divided document files and the job ticket saved in the storage unit in response to a request for printing from the print device, wherein the transmitting unit transmits the plurality of divided document files in an order described in the generated job ticket when the print device is in a printable status, and the transmitting unit transmits the plurality of divided document files in parallel when the print device is in an unprintable status.

5. The server system according to claim 4, wherein said transmitting unit further transmits the undivided original document file saved in the storage unit if the request from the print device specifies that the document file is to be saved after being printed.

6. The server system according to claim 4, wherein the document file includes setting information in which specification of two-sided printing or one-sided printing and a page layout are set, and said dividing unit refers to the setting information to divide the document file on the basis of separation between sheets of a printed sheet medium.

7. A non-transitory storage medium having recorded therein a program for causing a computer to function as each unit included in the server system according to claim 4.

8. A method in a server system connected with a print device and including a storage unit for saving externally an uploaded document file described in PDF (Portable Document Format), the method comprising:

dividing the uploaded document file into a plurality of document files;

generating a job ticket for printing the plurality of divided document files;

saving the plurality of divided document files and the job ticket in the storage unit; and transmitting the plurality of divided document files and the job ticket saved in the storage unit in response to a request for printing from the print device, wherein the plurality of divided document files are transmitted in an order described in the generated job ticket when the print device is in a printable status, and the plurality of divided document files are transmitted in parallel when the print device is in an unprintable status.

9. A print device connected with a server system, the print device comprising:

a request unit, configured to transmit, upon input of a print instruction to print a document file saved in the server system, a request for receiving a job ticket of the document file from the server system;

a receiving unit, configured to, when the print device is in a printable status, receive from the server system a plurality of divided document files in an order described in the job ticket received from the server system in response to the request; and a printing unit, configured to perform printing by using the plurality of divided document files received by said receiving unit, wherein the receiving unit, when the print device is in an unprintable status, receives from the server system the plurality of divided document files in parallel regardless of the order described in the job ticket.

10. The print device according to claim 9, wherein said receiving unit receives the document file with a limited reception band if the print device is executing another print job.

11. The print device according to claim 9, wherein a structure of the document file is described at the end of the document file.

12. The print device according to claim 9, further comprising a saving unit, configured to save the undivided original document file received from the server system in the storage unit if it is specified that the document file instructed to be printed is to be saved in the storage unit.

13. A method in a print device connected with a server system, the method comprising:

upon input of a print instruction to print document files saved in the server system, transmitting a request for receiving a job ticket of the document file from the server system;

when the print device is in a printable status, receiving from the server system a plurality of divided document files in an order described in the job ticket received from the server system in response to the request;

when the print device is in an unprintable status, receiving from the server system the plurality of divided document files in parallel regardless of the order described in the job ticket; and performing printing by using the plurality of divided document files received.

14. The method according to claim 13, further comprising:

saving the undivided original document file received from the server system in the storage unit if it is specified that the document file instructed to be printed is to be saved in the storage unit.

* * * * *